United States Patent Office 3,311,655
Patented Mar. 28, 1967

3,311,655
PROCESS FOR THE PREPARATION OF URETHANES
Jacques Boileau and Jean Vaganay, Sorgues, France, assignors to Etat Francais, représenté par le Ministre des Armées (Direction des Poudres), Paris, France
No Drawing. Filed May 19, 1961, Ser. No. 125,295
Claims priority, application France, May 24, 1960, 828,050; May 3, 1961, 860,551
7 Claims. (Cl. 260—471)

The present invention relates to a process for the preparation of urethanes, by reaction of an amine, phosgene and an ester having an —OH or —SH substituent, as well as to process for the preparation of 2,4-oxazolidine-diones from such urethanes.

More particularly the invention relates to a process for the preparation of urethanes of the formula:

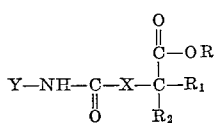

in which:
R represents a substituted or unsubstituted alkyl, cycloalkyl or aralkyl radical;
X represents sulphur or oxygen;
Y represents a substituted or unsubstituted alkyl, cycloalkyl, heterocyclic, aralkyl or aryl radical, Y preferably being an aryl radical having one, two or three halogen substituents, an alkyl substituent, a haloalkyl substituent, an alkoxy radical, a nitro group or a carbalkoxy radical; and,
$R_1$ and $R_2$ are the same or different and represent hydrogen, a straight or branched, substituted or unsubstituted alkyl radical or a substituted or unsubstituted aryl, cycloalkyl or aralkyl radical, $R_1$ and $R_2$ being, if required connected to form a polymethylene ring.

The invention also includes the preparation of cyclized derivatives of such urethanes, namely, substituted 2,4-ozazolidine-diones of the formula:

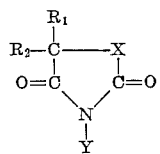

wherein $R_1$, $R_2$, X and Y have the meanings defined in the preceding paragraph.

The invention includes also the use of the products obtained by the aforementioned processes to regulation of the growth of plants, particularly of oxazolidine-diones of the formula defined above wherein neither $R_1$ nor $R_2$ is hydrogen.

Various processes for the preparation of urethanes are known (see Houben-Weyl, vol. 8, pp. 110 et seq.), such as those mentioned above.

In particular, an isocyanate having the formula YNCO was made to react with an ester having the formula:

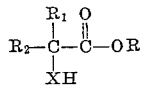

either with or without a solvent, most often at elevated temperature.

The urethane was obtainable in satisfactory yields by heating the reactants without a solvent at temperatures between 100° to 200° C.

More recently, it has been shown that the use of ether as a solvent leads to low yields or none at all; on the other hand, the use of benzene or toluene at elevated temperature and under reflux, for long periods of time, for example from 24 to 36 hours, allows higher yields to be obtained of from 27–65% in using a phenylisocyanate.

In order to obtain the isocyanates used in these known processes, the Curtius reaction was employed (action of sodium azide on acid chlorides); more frequently, phosgene (carbonyl chloride) was reacted with an amine or an amine salt; this latter reaction takes place either directly with an amine salt at elevated temperature or with an amine in the vapour phase, or with a free amine by operating in two stages in the following way:

In the first of these stages, the phosgene reacts with the amine in solution or in suspension in a solvent which is inert toward the phosgene, the amine and the isocyanate formed, at a temperature lower than 20° C., and a precipitate is formed containing a mixture of substituted carbamyl chloride and the amine hydrochloride;

In the second stage, the reaction medium is heated to a temperature ranging between 120° and 200° C., if required, while injecting phosgene so as to complete the reaction, and the isocyanate is finally recovered after degassing and rectification.

In this preparation of isocyanates, it is necessary to use a molar excess of phosgene with respect to the amine, in order to limit, if not to prevent, the formation of urea. The preparation proceeds with yields which generally do not exceed 85%.

In another known type of process for the manufacture of urethanes, an alcohol chloroformate, generally obtained by the action of phosgene on an alcohol, is reacted with an amine. In the case of the urethanes of the formula given above, a chloroformate having the formula:

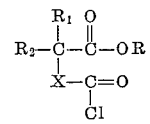

is reacted with an amine.

In general, the reaction of a chloroformate with an amine gives good yields, but the synthesis of the chloroformates per se is a rather slow reaction, with yields of 80–85% in general, and it also involves very serious problems of corrosion. Moreover, the chloroformates corresponding to the above formula have very rarely been prepared and their reaction with amines is not known.

In other processes, certain barbituric acids have been oxidized with hydrogen peroxide and the reaction product has then been saponified. These rather complicated processes require several stages and the corresponding raw materials are not always readily available.

In the process for preparing isocyanate mentioned above, in which operation occurs in two stages, it is known that if, after phosgenation in the cold, the reaction mixture is heated to a temperature not exceeding 60° C. while introducing phosgene, the reaction mixture remains in the form of a suspension, the carbamyl chloride or amine hydrochloride formed in the first stage remaining at least partially unreacted. The transformation of these two products into isocyanate takes place in a quasi-complete way only at a higher temperature, and this transformation is more rapid as the temperature becomes higher.

For example, in the preparation of phenylisocyanate, it is necessary to heat for about 15 hours at 85° C. and for about 2 to 3 hours at 125° C., to cause the disappearance of phenylcarbamyl chloride.

It has now been found that by carrying out the phosgenation reaction under conditions similar to those mentioned above, but in the presence of an ester of the formula:

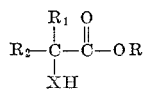

it is sufficient to keep the reaction medium at a temperature of about 50° to 60° C. for a relatively short time, such as two hours, for the precipitate formed in the first stage to disappear.

It has been observed that the amounts of free isocyanate, amine hydrochloride and substituted carbamyl chloride in the reaction mixture are practically zero or at least very small; undesirable secondary products are no longer obtained in appreciable quantity, such as the urea corresponding to the starting amine, in particular.

The present invention thus concerns a process for the preparation of urethanes corresponding to the formula given above which presents numerous advantages. It is simpler than processes according to which isocyanate or chloroformate must first be synthesized, because it requires less complex apparatus; also, because it takes place under milder conditions, it permits urethanes or their cyclized derivatives, namely 2,4-oxazolidine-diones, to be obtained with yields very close to the theoretical with respect to the starting amine.

According to the invention, an amine having the formula $YNH_2$ in solution or suspension is reacted with phosgene in solution in a solvent, such as those which are ordinarily used for the synthesis of isocyanates and do not have an active hydrogen atom, and an ester of the formula:

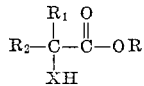

is introduced into the reaction mixture at a temperature lower than 85° C., the phosgene and the ester not being in a less than equimolar ratio with respect to the amine; the radicals Y, X, R, $R_1$ and $R_2$ have the above defined meanings.

The order of introduction of the reactants can be varied, but it is indispensable that, each time there is a possibility of formation of an isocyanate or carbamyl chloride molecule, there should already be in the reaction mixture at least one molecule of the ester having the —XH group. This means that at all times the amount of this ester introduced into the reaction mixture since the start of the reaction should be in a molar excess with respect to the amount of amine introduced since the start of the reaction. For example, it is possible to introduce first the entire amount of phosgene into the selected solvent and then pour in simultaneously a solution of amine and a solution of the ester, in the same solvent as the phosgene or in another solvent; the rates of pouring are regulated so as to respect the rule given above, viz., for each molecule of amine introduced into the mixture, it is necessary that at least one molecule of the ester carrying the —XH group has been introduced into the reaction mixture. It is usually advantageous to pour in a single solution of the amine and the ester, the latter then being able to act partially or entirely as a solvent for the amine. It is likewise also possible to introduce the ester first into the phosgene solution, and then the amine.

The solvent used should not have active hydrogen; it should not react with the amine, the phosgene or the corresponding isocyanate. It is therefore possible to use, for example, alone or in admixture, aliphatic hydrocarbons, such as heptane, cycloaliphatic hydrocarbons, such as cyclohexane, aromatic hydrocarbons, such as benzene and toluene, as well as their halogenated derivatives, such as chlorobenzene, ethers, such as n-butyl ether, esters, such as n-butyl acetate, and ketones, such as methyl isobutyl ketone.

In carrying out this reaction, the molar ratio of phosgene to amine is preferably from 1 to 1.5; a ratio higher than 1.5, while not being harmful, leads to an unnecessary consumption of phosgene and, also, makes the reaction slow down.

According to a preferred feature of the invention, the ester containing the —XH group is used in molar excess with respect to the amine, the molar proportion of the ester with respect to amine preferably being from 1 to 1.5; at higher ratios than 1.5, the ester is used up unnecessarily.

The reaction can be carried out continuously, for example, in cascade type reactors or reactors of the tubular type; it is advantageous to keep the molar proportions of the reactants indicated above, as well as the rule according to which, in any part of the reactor where a molecule of isocyanate or carbamyl chloride may be formed, there should already be in the reaction medium at least one molecule of the ester with the —XH group.

According to another preferred feature of the invention, when the phosgenation is carried out in two stages, the first is effected at low temperature, preferably between $-10°$ and 20° C., and the second at a temperature between 40° and 85° C., preferably between 45° and 70° C.

According to another preferred feature, when operating in a single stage, the reaction is carried out at a temperature between 40° and 85° C. and preferably between 45° and 70° C.

The present invention is also concerned with a process for the preparation of 2,4-oxazolidine-dione derivatives of the aforementioned urethanes, the derivatives having the formula:

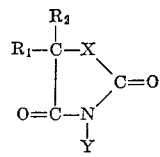

in which X, Y, $R_1$ and $R_2$ have the meanings given above.

In known processes (see J. M. Clark-Lewis, Chem. Review, vol. 58 (1958), pp. 63 et seq.) for the manufacture of these oxazolidine-diones, either the urethane or a mixture of an ester having an —XH group and the isocyanate having the formula YNCO are heated in an alkaline medium. These processes presuppose the preliminary manufacture of either the urethane or the isocyanate, plus, in the latter case, the disadvantages of yield and complexity of apparatus which have been mentioned.

Attempts have also been made, in other known processes, to avoid the passage through the isocyanate, either:

(1) By alkylating a non-N-substituted 2,4-oxazolidine-dione, by the action of a halogenated derivative on a metal salt of 2,4-oxazolidine-dione. This is a multi-stage process and is applicable in the case in which the halogen is reactive, but this does not usually occur with the aromatic series; or (2) By reacting the amine of the formula $YNH_2$ directly with the ester having the —XH group, in the presence of a substance which can supply the carbonyl function necessary for obtaining the oxazolidine-dione; esters of carbonic acid, such as methyl, ethyl and amyl carbonates in excess, have been used for this purpose in known processes. This leads to the formation of the 2,4-oxazolidine-dione in an alkaline medium after passing through an intermediate carbonate (L. Shapiro et al., J. Am. Chem. Soc., vol. 81 (1959), pp. 6498–6504).

However, the alkyl carbonates used in these processes are relatively costly products, thereby increasing the cost of obtaining the 2,4-oxazolidine-dione; besides, the yields of such a reaction do not exceed 80%.

According to the present invention, the reaction product from the preparation of the urethanes defined above is used directly; it is first degassed by heating, if required under vacuum, and, after removing the solvent, if desired, for example by distillation, the reaction mixture is heated in the presence of an alkaline catalyst. The solvent is removed by distillation, if it has a boiling point lower than that of the urethane; a 2,4-oxazolidine-dione containing a little unchanged urethane is thus obtained.

The heating temperature ranges from 50° to 200° C. and preferably lies between 100° and 150° C.

Cyclisation can occur instantaneously, in some cases, or can require a time of up to 24 hours.

The product can be used as such or after recrystallisation, if desired, for various purposes and, particularly, as a plant growth regulant.

The process of the invention thus has an important advantage in permitting the direct cyclisation of urethane into oxazolidine-dione, without the necessity for isolating the urethane or for preparing the isocyanate, YNCO.

The following examples of the process of the invention are given by way of illustration.

EXAMPLE 1

*Preparation of 3-chlorophenylcarbamate of ethylethoxycarbonyl (or 3-chlorophenylcarbamate of ethyl lactate)*

150 g. of phosgene (1.515 moles) diluted with 300 g. of toluene were introduced into a 1.5 litre flask and the flask was maintained at a temperature lower than 0° C.; a solution containing 127.5 g. of metachloroaniline (1 mole) and 142 g. of anhydrous ethyl lactate (1.2 moles) at a temperature of about 0° C. was poured into the flask, at atmospheric pressure and over a period of 30 minutes. The flask was heated to 50° C., then 70 g. of phosgene (0.70 mole) were introduced via a dip-tube over a period of 30 minutes.

The reaction products were then degassed by means of a current of dry air and the solvent was distilled off. 263 g. of a yellow oil were thus obtained, refractive index $n_D^{14°}=1.529$. Its nitrogen content was 5.0%. The isocyanate contained in the oil calculated as metachlorophenylisocyanate was 0.4%.

It was not possible to recrystallise or distill the product without decomposition, but the aforementioned properties prove that the yield of urethane exceeded 97%.

EXAMPLE 2

*Preparation of 3-chlorophenyl-5-methyl-2,4oxazolidine-dione*

The procedure was the same as in Example 1, up to and including the degassing operation.

Two-thirds of the solvent were distilled off so as to eliminate the final traces of phosgene and hydrochloric acid and the flask was allowed to cool to 80° C.; 2 cc. of triethylamine (0.014 mole) were then introduced. The contents of the flask were maintained at 80° C. for two hours and then subjected to distillation at ordinary pressure, which eliminates the ethanol and toluene, then to distillation under a pressure of 40 mm. of mercury up to 120° C., which expels traces of ethyl lactate and the amine. 233 g. of a product having a refractive index $n_D^{16°}=1.550$ were thus obtained.

This product was in the form of a viscous mass which crystallised slowly; its melting point was 53° C.

By means of a quantitative analysis with a Perkin Elmer spectrophotometer, an infra-red spectrum which indicated a purity of 87% was obtained, namely a yield of the oxazolidine-dione of 91% with respect to the initial amine.

By carrying out a double recrystallisation in ethyl ether, the oxazolidine-dione was obtained in the form of small white crystals melting at 59.8° C.

EXAMPLE 3

*Preparation of 3-chlorophenyl-5-methyl-2,4-oxazolidine-dione*

150 g. of phosgene (1.515 moles) diluted in 300 g. of chlorobenzene were introduced in a 1.5 litre flask. The temperature was maintained below 0° C. and a solution containing 127.5 g. (1 mole), of parachloroaniline and 142 g. (1.2 moles) of anhydrous ethyl lactate, cooled to a temperature of about 0° C., was poured in the flask over a period of 30 minutes, at atmospheric pressure. The flask was heated to 50° C., then 70 g. (0.70 mole) of phosgene were introduced by a dip-tube over a period of 30 minutes.

Degassing was then effected by a current of dry air and then two-thirds of the solvent were distilled off. The flask was allowed to cool to 80° C. and 2 cc. (0.014 mole) of triethylamine were introduced and the mixture heated for two hours at 80° C.

The contents of the flask were subjected to distillation at atmospheric pressure, then to distillation under vacuum and 217.5 g. of a product were obtained, which had the form of a clear yellow mass melting at 165° C.

A quantitative infra-red analysis indicated a purity of 83%, which indicated an 80% yield of oxazolidine-dione with respect to the parachloroaniline.

On recrystallising from benzene and then from anhydrous ethanol, the oxazolidine-dione was obtained in the form of small white needles melting at 172° C.

EXAMPLE 4

*Preparation of 3-chlorophenyl-5-phenyl-2,4-oxazolidine-dione*

75 g. of phosgene (0.757 mole) diluted in 150 g. of toluene were introduced in a 300 cc. flask. The temperature was maintained below 0° C. and a solution containing 64 g. (0.5 mole) of metachloroaniline and 99 g. (0.55 mole) of ethyl mandelate, cooled to a temperature of about 0° C., was poured into the flask over a period of 30 minutes at atmospheric pressure. The flask was heated to 50° C. and 35 g. (0.35 mole) of phosgene were introduced via a dip-tube over a period of 30 minutes.

Degassing, partial distillation of the solvent and cyclisation by triethylamine were carried out in the same way as in Example 3.

The oxazolidine-dione was obtained in a yield of 85% with respect to the metachloroaniline; it melts at 151° C.

EXAMPLE 5

127.5 g. (1 mole) of metachloroaniline diluted in 400 g. of toluene were introduced in a 1.5 litre flask and 36.5 g. (1 mole) of dry hydrogen chloride were introduced via a dip-tube.

The thick suspension of amine hydrochloride obtained was heated to 50° C. and 99 g. (1 mole) of phosgene were introduced over a period of 30 minutes.

It was observed that after this treatment, the suspension did not change in appearance and the gases eliminated from the flask were constituted by 0.97 mole of phosgene and 0.03 mole of hydrogen chloride.

The same experiment was begun again by replacing 100 g. of toluene with 118 g. (1 mole) of anhydrous ethyl lactate, so as to maintain the same concentration for the amine.

It was observed, at the end of this test, that the suspension had disappeared almost entirely and 0.28 mole of phosgene and 1.71 moles of hydrogen chloride were found in the gases evolved.

This therefore shows that in a normal method for the preparation of urethane or oxazolidine-dione from the requisite amine, in which the phosgene begins to transform the amine into carbamyl chloride and the amine hydrochloride, the latter is transformed to a very great extent from 50° C. and therefore permits the desired urethane to be obtained.

EXAMPLE 6

*Preparation of 3-benzyl-5-methyl-2,4-oxazolidine-dione*

160 g. of phosgene (1.616 moles) diluted in 300 g. of toluene were introduced into a 1.5 litre flask. The temperature was maintained below 6° C. and a solution containing 107 g. (1 mole) of rectified benzylamine and 142 g. (1.20 moles) of ethyl lactate was poured into this flask over a period of 30 minutes at atmospheric pressure. The flask was heated to 50° C. and then 69 g. (0.70 mole) of phosgene were introduced via a dip-tube over a period of 30 minutes.

Degassing was then effected by means of a current of dry air and then all the toluene was distilled off. The flask was allowed to cool to about 80° C.; 2 cc. (0.014 mole) of triethylamine were introduced and the flask was heated for two hours at 80° C.

The contents of the flask were subjected to distillation at atmospheric pressure and then to distillation under vacuum. 100 g. of a white crystalline product were obtained passing over at 200° C. under an absolute pressure of 77 mm. of mercury. The residue weighed 82.0 g. and had the form of a brown crystalline mass.

A quantitative infra-red analysis indicated a purity of 90% for the first product and a purity of 78% for the second, which indicated a yield of the oxazolidine-dione of 84.8% with respect to the benzylamine.

After recrystallisation from anhydrous methanol and then twice from anhydrous ethanol, the oxazolidine-dione was obtained in the form of small white needles melting at 74° C.

EXAMPLE 7

*Preparation of 3-(3-chlorophenyl)-5,5-dimethyl-2,4-oxazolidine-dione*

75 g. of phosgene (0.757 mole) diluted in 150 g. of toluene were introduced into a 1 litre flask. The temperature was maintained below 0° C. and a solution containing 64 g. of metachloroaniline (0.5 mole) and 69.5 g. of rectified ethyl acetonate (0.526 mole) was poured into the flask over a period of 30 minutes at atmospheric pressure. The flask was heated at 50° C. and then 40 g. (0.40 mole) of phosgene were introduced via a dip-tube over a period of 30 minutes.

Degassing, distillation of the solvent and cyclisation (1 cc. of triethylamine) were carried out in the same manner as in Example 6.

The contents of the flask were subjected to distillation at atmospheric pressure and then to distillation under vacuum, retaining only the oxazolidine-dione. This had the form of a brown crystalline mass, weighing 118.5 g.; it was purified by dissolution in boiling acetone, treatment with animal charcoal and then addition of petroleum ether (B.P. 60°–80°) to the acetone solution.

The oxazolidine-dione (91.2 g.) had the form of small white needles melting at 97° C. The yield of the pure product with respect to the metachloroaniline was 76%.

EXAMPLE 8

*Preparation of 3-phenyl-5-methyl-2,4-oxazolidine-dione*

Comparative tests have been carried out in order to vary the various conditions of the reaction.

*Test A.*—150 g. of phosgene (1.515 moles) of diluted in 300 g. of toluene were introduced into a 1.5 litre flask. The temperature was maintained below 0° C. and a cold solution containing 93 g. (1 mole) of rectified aniline and 142 g. (1.2 moles) of rectified ethyl lactate was poured into a flask over a period of 30 minutes at atmospheric pressure. The flask was heated to 50° C. and then, while maintaining the temperature a 50° C., 70 g. of phosgene (0.707 mole) were introduced via a dip-tube over a period of 50 minutes.

The reaction products were degassed by a stream of dry air, the last traces of hydrogen chloride dissolved being neutralised towards the end by the addition of 3 g. of ammonium carbonate. The solvent was distilled off first at ordinary pressure and then under reduced pressure in order to attain finally 170° C. in the flask and an absolute pressure of 35 mm. of mercury.

After cooling the flask to 100° C., cyclisation was effected by the addition of 3 g. of N-methyl-morpholine by adding 1 gram every 20 minutes. The flask was maintained between 100° and 120° C. at ordinary pressure, until cessation of the distillation of the ethanol (2 hours).

194.6 g. of a brown crystalline product melting at 130° C. remained in the flask, containing 87% of 3-phenyl-5-methyl-2,4-oxazolidine-dione (determination by infrared) and 13.3% of the phenylcarbamate of ethyl lactate (determined by the Zeisel method), the yield of the oxazolidine-dione thus being 87.6%.

100 g. of the crude ground product were taken and then triturated with 100 cc. of cold methanol (−20° C.), rapidly dried on a No. 3 sintered glass and 50 cc. of cold methanol were added. After drying, 78 g. of the oxazolidine-dione remained which had the form of small white needles melting at 140° C. The analyses indicated a content of 99% of oxazolidine-dione and 0.6% of urethane.

The filtrate and the methanol utilised for clarification were evaporated on a water-bath under vacuum and the residue was treated at 100° C. with N-methyl-morpholine; there was finally obtained 16.5 g. of the oxazolidine-dione which corresponded, taking into account the main product, to an overall yield with respect to the aniline of 96%.

Other tests were carried out by varying one and one only of the following factors in comparison with Test A:

The phosgene/aniline molar ratio,
The ethyl lactate/aniline molar ratio,
Temperature of the reaction in the hot with the phosgene,
Order of the introduction of the reactants.

*Test B.*—The same condition as in Test A were reproduced, except for the phosgene-aniline molar ratio which was increased from 2.2 to 2.5 (phosgene introduced in the cold: 1.5 moles; at 50° C.: 1 mole).

The final product obtained then weighed 203.1 g. and melted at 82° C.; it contained 70.6% of the oxazolidine-dione, the residue being essentially the phenylcarbamate of ethyl lactate.

*Test C.*—The phosgene/aniline molar ratio was varied which was 1.3 (phosgene introduced in the cold: 1 mole; at 50° C.: 0.3 mole).

The final product obtained then weighed 195.1 g.; it melted at 134° C.; it contained 91.5% of the oxazolidine-dione.

*Test D.*—The ethyl lactate/aniline molar ratio was varied from 1.2 to 1.5.

The final product was oily and weighed 211.3 g.; it contained 62% of the oxazolidine-dione, the residue being essentially the phenylcarbamate of ethyl lactate.

*Test E.*—The ethyl lactate/aniline molar ratio was modified to be 1.05.

The final product had a fatty appearance and weighed 177.7 g.; it contained 88.5% of the oxazolidine-dione.

*Test F.*—The temperature of introduction of the phosgene during the course of the second phase was introduced: 85° C. instead of 50° C.

The final product then obtained was oily and weighed 192.5 g.; it contained 59% of the oxazolidine-dione, the residue being essentially the phenylcarbamate of ethyl lactate.

*Test G.*—The temperature of the second phase of the reaction was modified, which was carried out at 40° C.

The final product then obtained had a fatty appearance and weighed 205.8 g.; it contained 69% of the oxazolidine-dione, the residue being essentially the phenylcarbamate of ethyl lactate.

*Test H.*—The order of introduction of the reactants was varied. 300 g. of toluene and 142 g. (1.2 moles) of ethyl lactate were first placed in the flask, which was then cooled to −15° C. and the introduction of phosgene was carried out in order to obtain the customary weight, namely 150 g. in solution. The 93 g. of aniline were then poured in at 0° C. over a period of 30 minutes. The end of the test was identical with that of Test A. The final product weighed 194.6 g.; it melted at 132° C. and contained 92% of the oxazolidine-dione.

All the crude products of Tests B to H were subjected to the treatment with methanol at −20° C. described in Test A, then to a further cyclisation on the residuary oils. The total yield of oxazolidine-dione equalled or exceeded 93%, except for Test E (ethyl lactate/aniline ratio=1.05) and for Test F (second phase of the reaction effected at 85° C.) where the total yield was of the order of 85%.

It can thus be taken that the factors studied have no substantial influence on the result of the reaction; they can thus be varied over wide limits.

EXAMPLE 9

*Preparation of 3-(methyl-phenyl)-5-methyl-2,4-oxazolidine-dione*

The preparation was carried out in the same manner as that of the unsubstituted 3-phenyl isomer described in Example 8(A) by substituting for the aniline 108 g. of paratoluidine (1 mole).

There remained in the flask at the end of the operation 224.2 g. of a slightly greasy brown product melting at 145° C., containing 80% of 3-(4-methyl-phenyl)-5-methyl-2,4-oxazolidine-dione and 11.6% of the paratolylcarbamate of ethyl lactate. The yield of the crude product was thus 87.5%.

Treatment with cold methanol gave a product in the form of white needles which melted at 160° C.

EXAMPLE 10

*Preparation of 3-N-(4-methoxy-phenyl)-5-methyl-2,4-oxazolidine-dione*

150 g. of phosgene (1.5 moles) diluted in 300 cc. of toluene were introduced into a 1.5 litre flask. A temperature below 6° C. was maintained and a solution containing 123 g. (1 mole) of para-anisidine and 142 g. (1.2 moles) of ethyl lactate was poured into the flask over a period of 30 minutes at atmospheric pressure. The flask was heated to 50° C. and then 60 g. (0.6 mole) of phosgene were introduced via a dip-tube over a period of 30 minutes.

Degassing was then effected by means of a current of dry air and then all the toluene was distilled off. The last traces of hydrogen chloride were neutralised by the addition of ammonium carbonate (about 6 g.) and the excess ethyl lactate was distilled off under vacuum in order to have at the end of the distillation a pressure of 20 mm. of mercury and a temperature of 150° C. in the flask. The flask was allowed to cool to 80° C. and then 2 cc. of N-methylmorpholine were added and it was heated to 100° to 120° C. to the end of the distillation of the methanol (about 4 hours). On cooling, a pale violet mass was obtained which was clarified twice by 50 cc. of cold methanol which yielded 117 g. of a white powder which triturated as 96% oxazolidine-dione. 36.2 g. of the oils obtained by evaporation of the solution in methanol contained 52% of the oxazolidine-dione.

The yield was thus 59% of oxazolidine-dione and 8% of urethane or a total of 67%.

The melting point of the oxazolidine-dione was 131°–132° C.

EXAMPLE 11

*Preparation of 3-(2-methoxy-5-chloro-phenyl)-5-methyl-2,4-oxazolidine-dione*

150 g. of phosgene (1.5 moles) diluted in 300 cc. of toluene were introduced into a 1.5 litre flask. A temperature below 6° C. was maintained and a solution containing 157 g. (1 mole) of 2-methoxy-5-chloro-aniline and 142 g. (1.2 moles) of ethyl lactate was poured into the flask over a period of 30 minutes at atmospheric pressure. The temperature of this solution was maintained at 60° C. throughout the introduction to prevent crystallisation. The flask was heated to 50° C. and then 60 g. (0.6 mole) of phosgene were introduced via a dip-tube over a period of 30 minutes.

Degassing was then effected by means of a stream of dry air and then all the toluene was distilled off. The last traces of hydrogen chloride were neutralised by the addition of ammonium carbonate (about 4 g.) and the excess ethyl lactate was distilled off under vacuum, in order to have at the end of the distillation a pressure of 20 mm. of mercury and a temperature of 150° C. in the flask. The flask was then allowed to cool to 80° C., 2 cc. of N-methyl-morpholine were added and the flask was heated to 100°–120° C. to the end of the distillation of the ethanol. On cooling, a brown mass was obtained which contained 0.30 mole of urethane. By clarification, 159 g. of white crystals were obtained of 96% oxazolidine-dione or 0.60 mole.

The total yield was thus 90%.

The melting point of the product was 132°–133° C.

EXAMPLE 12

*Preparation of 3-butyl-5-methyl-2,4-oxazolidine-dione*

150 g. (1.5 moles) of phosgene dissolved in 300 cc. of toluene were introduced into a 1.5 litre flask. A temperature below 6° C. was maintained and a solution containing 73 g. (1 mole) of n-butylamine and 142 g. (1.2 moles) of ethyl lactate was poured into the flask over a period of 30 minutes at atmospheric pressure. The flask was heated to 50° C. and then 60 g. (0.6 mole) of phosgene were introduced via a dip-tube over a period of 30 minutes.

Degassing was then effected by means of a stream of dry air and then all the toluene was distilled off. The last traces of hydrogen chloride were neutralised by the addition of 5 g. of neutral ammonium carbonate and the flask contents were distilled under vacuum to remove the excess ethyl lactate, so as to obtain finally a pressure of 20 mm. of mercury and a temperature of 150° C. in the flask. The flask was allowed to cool to 80° C. and 2 cc. of N-methyl-morpholine were introduced and the flask contents were heated to 100°–120° C. for 2 hours until the end of the distillation of the ethanol.

Distillation under vacuum produced a clear oily liquid, boiling point 83°–86° C., containing some crystals of ammonium chloride. It was filtered and there was finally obtained 100 g. of the oxazolidine-dione or a yield of 59%.

EXAMPLE 13

*Preparation of 3-(3-chloro-phenyl)-2,4-thiazolidine-dione*

150 g. of phosgene (1.5 moles) dissolved in 300 cc. of toluene were introduced into a 1.5 litre flask. A temperature below 6° C. was maintained and a solution containing 127 g. (1 mole) of meta-chloroaniline and 144 g. (1.2 moles) of ethyl thioglycolate was poured into the flask over a period of 30 minutes and at atmospheric pressure. The flask was heated to 50° C. and then 60 g. (0.6 mole) of phosgene were introduced via a dip-tube over a period of 30 minutes.

Degassing was then effected with a stream of dry air and then all the toluene was distilled off. The last traces of hydrogen chloride were neutralised by 5 g. of ammonium carbonate and the flask contents were distilled under vacuum to remove the excess ethyl thioglycolate, in order to have at the end of the distillation a pressure of 20 mm. of mercury and a temperature of 150° C. in the flask. The flask was then allowed to cool to 80° C., 2 cc. of N-methyl-morpholine were added and the flask was heated to 100°–120° C. to the end of the distillation of the ethanol (about 8 hours). On cooling, a light brown mass was obtained which was clarified twice by 100 cc. of cold methanol, which yielded 91 g. of white crystals containing 80% of the thiazolidine-dione (infra-red determination) and 19.1% of urethane (Zeisel determination) or a yield of 40% of the clarified product.

The melting point of the thiazolidine-dione was 118° C.

EXAMPLE 14

*Preparation of 3-stearyl-5-methyl-2,4-oxazolidine-dione*

71 g. (0.6 mole) of ethyl lactate diluted with 150 g. of toluene were introduced into a 1 litre flask; it was cooled to −15° C. and 75 g. (0.757 mole) of liquid phosgene were poured in. It was heated to −3° C. and 127 g. (0.5 mole) of pure stearylamine dissolved in 150 g. of toluene were poured in over a period of 1 hour between −5° and 0° C. (In order to maintain the stearylamine dissolved, the solution was maintained at 40° C.)

The flask was heated to 5° C. and then 36 g. (0.36 mole) of phosgene were introduced via a dip-tube over a period of 1 hour.

The course of the reaction was analogous to that described by Example 8.

The crude product weighed 199.5 g.; it softened at 44°–45° C.

A quantitative analysis by infra-red radiation allowed it to be determined that the crude product contained 55% of 3-stearyl-5-methyl-2,4-oxazolidine-dione; determination of the ethoxylated functions gave a urethane content of 34%; without taking into account the latter determination, the yield was 62.5%.

Recrystallisation from methanol gave a white solid melting at 53° C.; the recrystallisation gave a yield of 52%.

EXAMPLE 15

*Preparation of 3-(3-trifluoromethyl-phenyl)-5-ethyl-2,4-oxazolidine-dione*

30 g. (0.3 mole) of phosgene dissolved in 150 cc. of toluene were introduced into a 1 litre flask. The temperature was maintained below 6° C. and a solution containing 32.2 g. (0.2 mole) of meta-α,α,α-trifluorotoluidine and 31.2 g. (0.24 mole) of ethyl-α-hydroxybutyrate was poured into the flask over a period of 30 minutes at atmospheric pressure. The flask was heated to 50° C. and then 15 g. (0.15 mole) of phosgene were introduced via a dip-tube over a period of 20 minutes.

Degassing was then effected by means of a stream of dry air and then all the toluene was distilled off. The last traces of hydrogen chloride were neutralised by the addition of ammonium carbonate (about 1 g.) and the excess ethyl α-hydroxybutyrate was distilled off in order to have at the end of the distillation a pressure of 20 mm. of mercury at a temperature of 150° C. in the flask. The flask was allowed to cool to 80° C., 1 cc. of N-methyl-morpholine was added and it was heated to 120°–130° C. to the end of the distillation of the ethanol (about 2 hours). On cooling, a brown mass was obtained which was clarified twice with 30 cc. of cold methanol, which produced 18 g. of a white powder which contained 16.2 g. of the oxazolidine-dione and 0.1 g. of the urethane. The oils obtained by evaporation contained 16.9 g. of the oxazolidine-dione and 15.7 g. of the urethane.

The total yield was 85%.

The melting point of the oxazolidine-dione was 72°–73° C.

EXAMPLE 16

*Preparation of 3-(3-nitro-phenyl)-5-methyl-2,4-oxazolidine-dione*

150 g. (1.5 moles) of phosgene dissolved in 300 cc. of toluene were introduced into a 1.5 litre flask. The temperature was maintained below 6° C. and a solution containing 138 g. (1 mole) of meta-nitroaniline and 142 g. (1.2 moles) of ethyl lactate were poured into the flask over a period of 30 minutes at atmospheric pressure (to maintain the meta-nitroaniline dissolved, the solution was heated to 70° C.). The flask was heated to 50° C. and then 60 g. (0.6 mole) of phosgene were introduced via a dip-tube over a period of 30 minutes.

Degassing was then effected by a current of dry air and then all the toluene was distilled off. The last traces of hydrogen chloride were neutralised by the addition of ammonium carbonate (about 5 g.) and the flask contents were distilled under vacuum to remove the excess ethyl lactate in order to have at the end of the distillation a pressure of 20 mm. of mercury and a temperature of 150° C. in the flask. The flask was then allowed to cool to 80° C., 2 cc. of N-methyl-morpholine were added and the flask contents were heated to 130°–140° C. to the end of the distillation of the ethanol (about 4 hours). On cooling, a brown mass was obtained which was clarified twice with 100 cc. of cold methanol, which produced 153.6 g. of a grey powder which analysed as 87% of the oxazolidine-dione and 3.67% of the urethane. The oils obtained by evaporation of the ethanol contained 11.3 g. of the oxazolidine-dione and 68 g. of the urethane.

The total yield was 88%.

The melting point of the oxazolidine-dione was 143°–144° C.

EXAMPLE 17

*Preparation of 3-phenyl-5-methyl-2,4-thiazolidine-dione*

150 g. (1.5 moles) of phosgene dissolved in 300 cc. of toluene were introduced into a 1.5 litre flask. The temperature was maintained below 6° C. and a solution containing 93 g. (1 mole) of aniline and 161 g. (1.2 moles) of ethyl thiolactate was poured into the flask over a period of 30 minutes at atmospheric pressure. The flask was heated to 50° C. and then 60 g. (0.6 mole) phosgene were introduced via a dip-tube over a period of 30 minutes.

Degassing was then effected by means of a current of dry air and all the toluene was then distilled off. The last traces of hydrogen chloride were neutralised by the addition of ammonium carbonate (about 4 g.) and the excess ethyl thiolactate was distilled under vacuum in order to have at the end of the distillation a pressure of 20 mm. of mercury and a temperature of 150° C. in the flask. The flask was allowed to cool to 80° C., 2 cc. of N-methyl-morpholine were added and it was heated to 110°–130° C. to the end of the distillation of the ethanol (about 4 hours). On cooling, a brown mass was obtained which was clarified twice with 150 cc. of cold methanol. The slightly yellow crystals (67 g.) obtained contained 57.6 g. of the thiazolidine-dione and 3.1 g. of the urethane. The clarified oils contained 81 g. of the urethane.

The total yield was thus 64%.

The melting point of the thiazolidine-dione was 108°–109° C.

EXAMPLE 18

*Preparation of 3-phenyl-5,5-pentamethylene-2,4-oxazolidine-dione*

30 g. (0.3 mole) of phosgene dissolved in 200 cc. of toluene were introduced into a 1.5 litre flask. The temperature was maintained below 6° C. and a solution containing 40 g. (0.25 mole) of cyclohexanol-1-methylcarboxylate and 20.5 g. (0.22 mole) of aniline was poured in over a period of 10 minutes at atmospheric pressure. The flask was heated to 50° C. and then 19 g. (0.15 mole) of phosgene was introduced via a dip-tube over a period of 10 minutes.

Degassing was then effected by means of a current of dry air and then all the toluene was distilled off. The last traces of hydrogen chloride were neutralised by the addition of ammonium carbonate (about 1 g.) and the excess cyclohexanol-1-methyl-carboxylate was distilled off under vacuum in order to have at the end of the distillation a pressure of 20 mm. of mercury and a temperature of 150° C. in the flask. The flask was then allowed to cool to 80° C., 2 cc. of N-methyl-morpholine were added and it was heated to 100°–120° C. to the end of the distillation of the methanol. On cooling, a brown mass was obtained which was clarified twice with 100 cc. of methanol. There was thus obtained 34.5 g. of white crystals which analysed at 87.5% of the oxazolidine-dione. The 15.5 g. of oils obtained by concentration of the methanol contained 1.5 g. of the oxazolidine-dione and 1.28 g. of the urethane.

The total yield was thus 79%.

The melting point of the oxazolidine-dione was 131°–132° C.

EXAMPLE 19

*Preparation of 3-phenyl-2,4-thiazolidine-dione*

150 g. (1.5 moles) of phosgene dissolved in 300 cc. of toluene were introduced into a 1.5 litre flask. The temperature was maintained below 6° C. and a solution containing 93 g. (1 mole) of aniline and 134 g. (1.2 moles) of ethyl thioglycolate was poured into the flask over a period of 30 minutes at atmospheric pressure. The flask was heated to 50° C. and then 60 g. (0.6 mole) of phosgene was introduced via a dip-tube over a period of 30 minutes.

Degassing was then effected by a current of dry air and then all the toluene was distilled off. The last traces of hydrogen chloride were neutralised by the addition of ammonium carbonate (about 4 g.) and the excess ethyl thioglycolate was distilled off under vacuum in order to have at the end of the distillation a pressure of 20 mm. of mercury and a temperature of 150° C. in the flask. The flask was allowed to cool to 80° C., 2 cc. of N-methyl-morpholine were added and the flask was heated to 100°–120° C. to the end of the distillation of the ethanol (about 3 hours). On cooling, a brown mass was obtained which was clarified twice with 100 cc. of cold methanol which gave 91.5 g. of a clear yellow powder which analysed at 88% of the thiazolidine-dione.

The yield was 50%.

The melting point of the thiazolidine-dione was 134°–135° C.

EXAMPLE 20

*Preparation of 3-(para-methoxy-benzyl)-2,4-oxazolidine-dione*

30 g. (0.3 mole) of phosgene dissolved in 150 cc. of toluene were introduced into a 1 litre flask. The temperature was maintained below 6° C. and a solution containing 27.5 g. (0.2 mole) of para-methoxybenzylamine and 25 g. (0.24 mole) of ethyl glycolate was poured into the flask over a period of 30 minutes at atmospheric pressure. The flask was heated to 50° C. and then 15 g. (0.15 mole) of phosgene was introduced via a dip-tube over a period of 20 minutes.

Degassing was then effected by a stream of dry air and then all the toluene was distilled off. The last traces of hydrogen chloride was neutralised by the addition of ammonium carbonate (about 2 g.) and the excess ethyl glycolate was distilled in order to have at the end of the distillation a pressure of 20 mm. of mercury and a temperature of 150° C. in the flask. The flask was allowed to cool to about 80° C., 1 cc. of N-methyl-morpholine was added and it was heated to 130°–140° C. to the end of the distillation of the ethanol (about 4 hours). On cooling, a brown mass was obtained which was clarified twice with 20 cc. of cold methanol which produced 22 g. of the oxazolidine-dione.

The yield was 51%.

*Example 21*

*Preparation of 3-(2-pyridyl)-5-methyl-2,4-oxazolidine-dione*

150 g. (1.5 moles) of phosgene dissolved in 300 cc. of toluene were introduced into a 1.5 litre flask. A temperature below 6° C. was maintained and a solution containing 94 g. (1 mole) of 2-amino-pyridine and 142 g. (1.2 moles) of ethyl lactate was poured into the flask over a period of 30 minutes at atmospheric pressure. The flask was heated to 50° C. and then 60 g. (0.6 mole) of phosgene was introduced via a dip-tube over a period of 30 minutes.

Degassing was then effected by means of a stream of dry air and then all the toluene was distilled off. The hydrogen chloride both dissolved and fixed the pyridine N atom was neutralised by ammonium carbonate (about 50 g.) and the excess ethyl lactate was distilled off in vacuum, in order to have at the end of the distillation a pressure of 20 mm. of mercury and a temperature of 150° C. in the flask. The flask was allowed to cool to 80° C., 2 cc. of N-methyl-morpholine were added and the flask was heated to 100°–120° C. to the end of the distillation of the ethanol (about 1 hour). On cooling, a light brown oil was obtained which was distilled under vacuum which produced 70 g. of the oxazolidine-dione, the boiling points being: $E.B._{27}$ 190°–195° C.; $E.B._1$ 147–153° C.

The yield was 37% of the distilled oxazolidine-dione without recycling of the urethane.

The very wide generality of the process according to the invention has been shown by means of the various examples above. This process allows products to be obtained which have already been described; it also enables other compounds which are also equally interesting to be obtained.

In particular, the urethanes which are products of the reaction of the invention and the oxazolidines-diones in which both $R_1$ and $R_2$ are substituents have remarkable properties for regulating the growth of plants.

The standard tests for this purpose have been carried out to illustrate these properties. The method summarised below has been employed:

The test plants were cultivated in rows in pots filled with coarse sand and regularly watered with a complete mineral solution, namely with 1 plant per pot. The products were applied when the plants were about 15 to 20 days old; assessment was effected 15 days to 3 weeks after treatment.

Dissolution of the products was made using the product known under the name "Tween" 80 or 85; the solution thus obtained was emulsified in water (the "Tween" thus serving both as a dispersing agent and as an emulsifier).

The emulsion obtained under these circumstances contained less than 5% "Tween." A constant volume was applied to each plant in the form of a fine mist in order to wet all the foliar surface and to water the soil at the same time. The concentrations of active product were $5 \times 10^{-4}$; $1.5 \times 10^{-3}$ and $2.5 \times 10^{-3}$ corresponding to the use of doses of 5, 15 and 25 kg./ha.

The dry weights of the plants on testing is expressed as a percentage of that of the control plants which received the "Tween" solution alone. The results are tabulated for a mean dose of 15 kg./ha. of active product.

This method of dissolving and emulsifying in water is not exclusive; the use of other solvents and other dispersing agents and emulsifiers which are solid or liquid can also be envisaged in order to obtain either an emulsion, a suspension or a dustable powder.

The growth of the plants treated under the conditions indicated above was thus noted. The following symbols were thus given according to results:

o signifies a product without action
x signifies growth reduced by 0 to 25%
xx signifies growth reduced by 25 to 50%
xxx signifies growth reduced by 50 to 75% xxxx signifies growth reduced by 75 to 100% or death of the plant
— signifies test not carried out.

The plants upon which the tests were carried out are indicated in the columns of the table below as:

Tomato _____ Column 1.
Mustard _____ Column 2.
Radish _____ Column 3.
Green pea _____ Column 4.
Oat (*Avena sativa*) and wheat
  (*Triticum vulgare*) _____ Column 5.
Wild oat (*Avena fatua*) and
  foxtail (*Alopecurus agrestis*) _____ Column 6.
*Elianthus annuus* and *Pomea
  purpurea* _____ Column 7.

For columns 5 and 7, the averages of the results on 2 plants are given.

The oxazolidine-diones tested corresponded to the formula already given in which X represents an oxygen atom and Y, $R_1$ and $R_2$ have the meanings defined in the table.

| Y | $R_1$ | $R_2$ | 1 | 2 | 3 | 4 | 5 | 6 | 7 |
|---|---|---|---|---|---|---|---|---|---|
| $C_6H_5$ | $CH_3$ | $CH_3$ | - | xxx | o | o | x | x | xx |
| m $ClC_6H_4$ | $CH_3$ | $CH_3$ | xx | xx | - | o | x | x | xx |
| p $ClC_6H_4$ | $CH_3$ | $CH_3$ | xx | xxx | - | o | x | xx | o |
| $C_6H_5$ | $CH_3$ | $C_2H_5$ | xxx | xxx | - | - | xx | - | - |
| m $ClC_6H_4$ | $CH_3$ | $C_2H_5$ | xxxx | xx | - | o | xx | - | xxx |
| p $ClC_6H_4$ | $CH_3$ | $C_2H_5$ | xxx | xxx | - | - | xx | - | - |
| $C_6H_5$ | Cyclopentamethylene. | | x | xxx | o | xx | x | x | xx |
| m $ClC_6H_4$ | Cyclopentamethylene. | | x | xx | o | o | x | x | x |
| p $ClC_6H_4$ | Cyclopentamethylene. | | x | xx | o | o | x | x | x |
| $C_6H_5$ | Cyclotetramethylene. | | x | xxx | o | o | x | xxx | xx |
| m $ClC_6H_4$ | Cyclotetramethylene. | | xx | xxx | o | o | x | x | xxx |
| p $ClC_6H_4$ | Cyclotetramethylene. | | x | xxx | o | o | x | x | xxx |

It can thus be seen that these compounds have marked selective activity.

In the above examples, carried out at a stage which is not completely industrial, an excess of phosgene with respect to the amine up to 2.5 was used; it is preferable, however, in industrial preparation, not to exceed the value of 1.5 for this excess.

We claim:
1. A method of preparing a urethane of the formula:

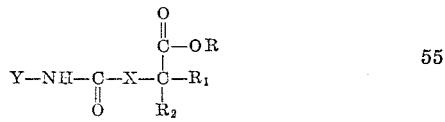

wherein:
R is an alkyl group having 1–4 carbon atoms;
X is selected from the group consisting of sulphur and oxygen;
Y is selected from the group consisting of
  (a) alkyl groups having up to 18 carbon atoms,
  (b) pyridyl,
  (c) phenyl,
  (d) halophenyl,
  (e) nitrophenyl,
  (f) methoxyphenyl, and
  (g) benzyl;
$R_1$ and $R_2$ are selected from the group consisting of hydrogen, lower alkyl, and phenyl, and wherein $R_1$ and $R_2$ may be linked to form a polymethylene ring of 4–5 carbon atoms, comprising mixing an amine of the formula $YNH_2$ where Y is as defined above, with phosgene and an ester of the formula:

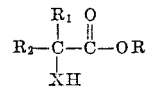

wherein X, R, $R_1$ and $R_2$ are as defined above, and heating the mixture containing the three said reactants to a temperature of not more than 85° C., the ester being present in the mixture in molar excess of the amine at all times, whereby a urethane of the said formula is formed.

2. A method of preparing a urethane of the formula:

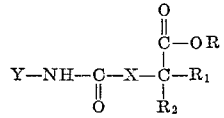

wherein:
R is an alkyl group having 1–4 carbon atoms;
X is selected from the group consisting of sulphur and oxygen;
Y is selected from the group consisting of
  (a) alkyl groups having up to 18 carbon atoms,
  (b) pyridyl,
  (c) phenyl,
  (d) halophenyl,
  (e) nitrophenyl,
  (f) methoxyphenyl, and
  (g) benzyl;
$R_1$ and $R_2$ are selected from the group consisting of hydrogen, lower alkyl, and phenyl, and wherein $R_1$ and $R_2$ may be linked to form a polymethylene ring of 4–5 carbon atoms, comprising mixing an inert organic solvent with an amine of the formula $YNH_2$ where Y is as defined above, phosgene and an ester of the formula:

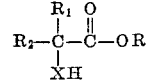

wherein X, R, $R_1$ and $R_2$ are as defined above, and heating the mixture containing the three said reactants to a temperature of not more than 85° C., the amount of phosgene being from 1.1 to 5 moles and the amount of ester being from 1.05 to 3 moles per mole of the amine, the ester being present in the mixture in molar excess of the amine at all times, whereby a urethane of the said formula is formed.

3. A method of preparing a urethane of the formula:

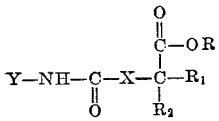

wherein:
R is an alkyl group having 1-4 carbon atoms;
X is selected from the group consisting of sulphur and oxygen;
Y is selected from the group consisting of
(a) alkyl groups having up to 18 carbon atoms,
(b) pyridyl,
(c) phenyl,
(d) halophenyl,
(e) nitrophenyl,
(f) methoxyphenyl, and
(g) benzyl;
$R_1$ and $R_2$ are selected from the group consisting of hydrogen, lower alkyl, and phenyl, and wherein $R_1$ and $R_2$ may be linked to form a polymethylene ring of 4-5 carbon atoms, comprising mixing an inert organic solvent with an amine of the formula $YNH_2$ where Y is as defined above, phosgene and an ester of the formula:

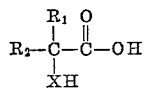

wherein X, R, $R_1$ and $R_2$ are as defined above, and heating the mixture containing the three said reactants to a temperature of —10° to 85° C., the amount of phosgene being from 1.3 to 2.5 moles and the amount of ester being from 1.05 to 1.5 moles per mole of the amine, the ester being present in the mixture in molar excess of the amine at all times, whereby a urethane of the said formula is formed.

4. The method as set forth in claim 1 in which the ester is introduced into the reaction mixture as the reaction proceeds at a rate proportional to the amine in such a way that at any instant the amount of ester which has been introduced is in molar excess of the amine which has been introduced.

5. The method as set forth in claim 1 in which the ester is introduced into the reaction mixture with the phosgene at the start of the process.

6. A method of preparing a urethane of the formula:

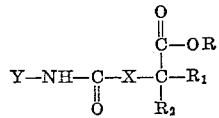

wherein:
R is an alkyl group having 1-4 carbon atoms;
X is selected from the group consisting of sulphur and oxygen;
Y is selected from the group consisting of
(a) alkyl groups having up to 18 carbon atoms,
(b) pyridyl,
(c) phenyl,
(d) halophenyl,
(e) nitrophenyl,
(f) methoxyphenyl, and
(g) benzyl;
$R_1$ and $R_2$ are selected from the group consisting of hydrogen, lower alkyl, and phenyl, and wherein $R_1$ and $R_2$ may be linked to form a polymethylene ring of 4-5 carbon atoms, comprising mixing an inert organic solvent with an amine of the formula $YNH_2$ where Y is as defined above, phosgene and an ester of the formula:

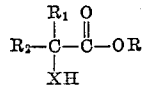

wherein X, R, $R_1$ and $R_2$ are as defined above, and heating the mixture containing the three said reactants for a first period to a temperature of —10° to 20° C., then for a second period to a temperature of 40° to 85° C., the amount of phosgene being from 1.3 to 2.5 moles and the amount of ester being from 1.05 to 1.5 moles per mole of the amine, the ester being present in the mixture in molar excess of the amine at all times, whereby a urethane of the said formula is formed.

7. A method of preparing the 3-chlorophenylcarbamate of ethyl lactate comprising mixing metachloroaniline in an inert organic solvent with ethyl lactate and phosgene, and heating the mixture containing the three said reactants for a first period to a temperature of —10° to 20° C., then for a second period to a temperature of 45°–70° C., the amount of phosgene being from 1.1 to 5 moles and the amount of ethyl lactate being from 1.05 to 3 moles per mole of the metachloroaniline, the ethyl lactate being present in the mixture in molar excess of the metachloroaniline at all times, whereby the said 2-chlorophenylcarbamate of ethyl lactate is formed.

References Cited by the Examiner

UNITED STATES PATENTS

| | | | |
|---|---|---|---|
| 2,630,381 | 3/1953 | Schlesinger et al. | 71—2.5 |
| 2,695,913 | 11/1954 | Bloch et al. | 260—471 |
| 2,789,129 | 4/1957 | Lister | 260—471 |
| 2,885,433 | 5/1959 | Hagemann et al. | 260—295 |
| 2,910,479 | 10/1959 | De Stevens | 260—294.8 |
| 2,921,939 | 1/1960 | Ramsden | 260—295 |
| 2,929,819 | 3/1960 | Erlenmeyer | 260—296 |
| 2,954,381 | 9/1960 | Shapiro et al. | 260—295 X |
| 2,977,370 | 3/1961 | Oken et al. | 260—307.3 |
| 3,012,008 | 12/1961 | Lister | 260—471 |

OTHER REFERENCES

Fieser et al.: "Organic Chemistry," 3rd ed., pages 608–9, Reinhold (1956).

Noller: "Chemistry or Organic Compounds," 2nd ed. pp. 315–317 (Saunders) (1957).

WALTER A. MODANCE, *Primary Examiner.*

R. T. BOND, D. T. McCUTCHEN, *Assistant Examiners.*